US010960780B2

(12) United States Patent
Voigts et al.

(10) Patent No.: US 10,960,780 B2
(45) Date of Patent: Mar. 30, 2021

(54) CHARGING DEVICE FOR SUPPLYING ELECTRICAL CHARGING ENERGY (71) Applicant: Ford Motor Company, Dearborn, MI (US)

(72) Inventors: Christoph Voigts, Cologne (DE); Erika Tsubaki, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 576 days.

(21) Appl. No.: 15/807,969

(22) Filed: Nov. 9, 2017

(65) Prior Publication Data
US 2018/0126859 A1  May 10, 2018

(30) Foreign Application Priority Data

Nov. 9, 2016  (DE) ..................... 10 2016 222 014.4

(51) Int. Cl.
*G05D 1/00* (2006.01)
*B60L 53/16* (2019.01)
(Continued)

(52) U.S. Cl.
CPC ............. *B60L 53/16* (2019.02); *B60L 1/006* (2013.01); *G05D 1/0088* (2013.01); *H02J 7/00* (2013.01);
(Continued)

(58) Field of Classification Search
CPC ........ B60L 1/006; B60L 53/14; B60L 53/305; B60L 53/68; B60L 2240/72; B60L 53/57; B60L 53/65; B60L 58/12; B60L 53/16; B60L 2200/16; B60L 2220/50; B60L 50/66; B60L 53/00; B60L 53/11; B60L 53/60; B60L 55/00; G01C 21/3469; G01C 21/3415; G01C 21/20; G01C 21/3697; G01C 21/00; G01C 21/3407; G01C 21/3453; G01C 21/362; G01C 21/3691; G07F 15/003; Y02T 10/70; Y02T 90/12;
(Continued)

(56) References Cited

U.S. PATENT DOCUMENTS 8,963,481 B2 * 2/2015 Prosser ................. B60L 53/305
320/104
9,230,236 B2  1/2016 Villamar
(Continued)

FOREIGN PATENT DOCUMENTS

DE  102012016234 A1  2/2014
DE  102014220256 A1  4/2016
EP    2429071 A1  3/2012

*Primary Examiner* — Tuan C To
*Assistant Examiner* — Paul A Castro
(74) *Attorney, Agent, or Firm* — Brooks Kushman PC; Gregory P. Brown (57) ABSTRACT

The disclosure relates to a charging device that supplies electrical charging energy for electrical energy stores of mobile electrical consumer units. The mobile electrical consumer units have at least one electrical energy storage unit and at least one charging interface via which electrical charging energy can be transferred from the energy storage unit to an energy store of a mobile electrical consumer unit. In order to improve the availability of electrical charging energy for energy stores of mobile electrical consumer units, the charging device takes the form of a self-driving motor vehicle.

9 Claims, 5 Drawing Sheets (51) Int. Cl.
- B60L 1/00 (2006.01)
- H02J 7/00 (2006.01)
- H02J 7/34 (2006.01)
- H02J 50/10 (2016.01)
- H02J 7/02 (2016.01)
- H02J 50/80 (2016.01)
- H02J 50/90 (2016.01)

(52) U.S. Cl.
CPC ............ H02J 7/0047 (2013.01); H02J 7/342 (2020.01); *B60L 2240/62* (2013.01); *B60L 2260/32* (2013.01); *H02J 7/00034* (2020.01); *H02J 7/0048* (2020.01); *H02J 7/025* (2013.01); *H02J 50/10* (2016.02); *H02J 50/80* (2016.02); *H02J 50/90* (2016.02); *Y02T 10/72* (2013.01); *Y02T 90/16* (2013.01)

(58) Field of Classification Search
CPC ....... Y02T 90/14; Y02T 90/167; Y02T 10/72; Y02T 10/7072; Y02T 10/64; G05D 1/0225; G05D 1/0088; G05D 2201/0213; H02J 7/342

See application file for complete search history.

(56) References Cited

U.S. PATENT DOCUMENTS

| | | |
|---|---|---|
| 9,256,852 B1 | 2/2016 | Myllymaki |
| 2011/0055037 A1 | 3/2011 | Hayashigawa et al. |
| 2011/0191013 A1 | 8/2011 | Leeser |
| 2015/0006005 A1 | 1/2015 | Yu et al. |
| 2015/0165895 A1 | 6/2015 | Menor et al. |
| 2016/0114887 A1* | 4/2016 | Zhou .................... B60F 3/0007 348/148 |

\* cited by examiner

CHARGING DEVICE FOR SUPPLYING ELECTRICAL CHARGING ENERGY

CROSS-REFERENCE TO RELATED APPLICATIONS

This application claims foreign priority benefits under 35 U.S.C. § 119(a)-(d) to DE Application 10 2016 222 014.4 filed Nov. 9, 2016, which is hereby incorporated by reference in its entirety.

TECHNICAL FIELD

The disclosure relates to a charging device and system that supplies electrical charging energy for electrical energy stores of mobile electrical consumer units.

BACKGROUND

As the demand for environmentally sustainable motor vehicles grows, more and more motor vehicles are being equipped with electric drive units that have electrical energy stores. The electrical energy stores need to be charged regularly with electricity, which usually takes place at fixed charging stations to which users need to drive.

The number of mobile appliances such as, for example, smartphones, laptops and the like, is also rapidly increasing and these also have electrical energy stores. These electrical energy stores also need to be charged regularly with electricity, which can take place at public and private charging stations or power outlets.

In the context of the present application, motor vehicles that can be powered electrically and mobile appliances are generally referred to as mobile electrical consumer units. A mobile electrical consumer unit can, however, also take other forms as long as it has at least one electrical energy store which can be charged with electricity.

Because of the limited number of charging stations, they are, however, not always available everywhere, which can be a problem in particular during a drive with a motor vehicle that can be powered electrically when the electrical energy store of the motor vehicle needs to be charged immediately.

SUMMARY

It is an object of the disclosure to improve the availability of electrical charging energy for energy stores of mobile electrical consumer units.

This object is achieved by the independent patent claims. Advantageous embodiments are reproduced in the description below, the dependent patent claims, and the drawings, wherein these embodiments can, taken individually or in different combinations with each other, in each case represent an aspect of the disclosure that is a development and in particular is also preferred or advantageous. Embodiments of the charging device can thus correspond to embodiments of the system, and vice versa, even when there is no explicit reference to this in individual cases below.

A charging device according to the disclosure that supplies electrical charging energy for electrical energy stores of mobile electrical consumer units comprises at least one electrical energy storage unit and at least one charging interface via which electrical charging energy can be transferred from the energy storage unit to an energy store of a mobile electrical consumer unit, wherein the charging device is a self-driving motor vehicle.

Location information, in particular, a temporary location or a soon-to-be-reached location of a mobile electrical consumer unit that is to be charged with electricity can, as required, be communicated to the charging device according to the disclosure via a wireless communication network so that the charging device, because it takes the form of a self-driving vehicle, can begin to drive itself to the mobile electrical consumer unit that is to be charged with electricity. For this purpose, the charging device according to the disclosure preferably comprises a navigation system that uses the location information received by the charging device, and a temporary location of the charging device itself, to plot the self-driven journey.

Consequently, according to the disclosure electrical charging energy required by a mobile electrical consumer unit that is to be charged with electricity is brought to the consumer unit. There is no need, as was customary previously, for a mobile electrical consumer unit that is to be charged with electricity to be moved to a fixed charging station. The disclosure thus considerably improves the availability of electrical charging energy for energy stores of mobile electrical consumer units, and permits availability of electrical charging energy over a much wider area.

The charging device preferably takes the form of an electrically powered self-driving motor vehicle. For this purpose, the charging device can have at least one electric drive to drive at least one driving wheel that is supplied with electrical drive energy from the energy storage unit or a separate energy store.

The energy storage unit can be designed, for example, as a compact lithium-ion battery. The charging device can also have two or more energy storage units that are connected to each other, in particular, electrically.

The electrical charging interface can be connected to the mobile electrical consumer unit via a charging cable, wherein the charging interface can have a plug socket or a plug for this purpose. Alternatively or additionally, the charging interface can be designed for contactless inductive charging of an electrical energy store of a mobile electrical consumer unit.

The disclosure is particularly advantageous for commuters, town dwellers, elderly people, disabled people, children, and tourists in urban areas, for example in the Asia-Pacific region and in Europe or in other megacities that are growing around the world because these people no longer need to search for fixed charging stations and visit them.

According to an advantageous embodiment, the charging device comprises at least one electrical interface via which electrical charging energy can be transferred from an electrical charging station to the energy storage unit. This makes it possible to recharge the electrical energy storage unit of the charging device after an electrical energy store of at least one mobile electrical consumer unit has been charged with electricity using the charging device. For this purpose, once a preset minimum charging level of the energy storage unit has been reached, the charging device can drive itself, in particular, using the navigation system, to a specific, for example nearest, charging station at which the energy storage unit is charged with electricity. The electrical interface can be connected to the charging station via a charging cable, wherein the electrical interface can have a plug socket or a plug for this purpose. Alternatively or additionally, the electrical interface can be designed for contactless inductive charging of the electrical energy storage unit of the charging device.

According to a further advantageous embodiment, the charging device is designed as a two-track motor vehicle that has only two wheels, which are driven individually. As a result, the charging device can have a very compact design. The two wheels can be arranged so that the two wheels can rotate about a common axis of rotation. Because the wheels are driven individually, the charging device can be steered by the wheels being driven at different speeds. In addition, the charging device can be equipped with driving dynamics sensors, in particular, acceleration sensors, in order to be able to ensure that it drives safely, and so that the device can balance itself via an electronic drive control system.

According to a further advantageous embodiment, a height of the charging device corresponds to a height of the wheels. This permits a very compact design of the charging device and very good maneuverability of the charging device. Dimensions of the charging device given in the side view are preferably largely defined by dimensions of the wheels.

According to a further advantageous embodiment, the charging device comprises at least one sensor device that records information about the surroundings of the charging device. As a result, the charging device can detect, for example, objects such as, for example, vehicles, people, or other obstacles in its surroundings in order to ensure that the charging device drives safely and avoids collisions. Passive traffic signals such as, for example, signs and active traffic signals such as, for example, traffic lights can also be detected by the sensor device and taken into consideration when the charging device is driving. Alternatively or additionally, the charging device can also receive radio signals, for example from traffic lights or the like, via the sensor device, in order to take the radio signals into consideration when driving. The sensor device can have at least one sensor, for example an optical sensor, an infrared sensor, or the like. The sensor device preferably comprises a right-hand sensor, wherein information about the surroundings on a right-hand side of the charging device with respect to a direction in which the charging device is driving can be recorded, and a left-hand sensor wherein information about the surroundings on a left-hand side of the charging device can be recorded. The charging device can comprise data-processing, for example image-processing, in order to be able to evaluate sensor data to drive the charging device.

According to a further advantageous embodiment, the charging device comprises at least one display unit that displays a charging level of the energy storage unit. As a result, a temporary charging level of the energy storage unit can be visually detected by a person.

According to a further advantageous embodiment, the charging device comprises a housing unit, to accommodate the energy storage unit, on which at least one front lamp and/or at least one rear lamp and/or at least two driving direction indicators is/are arranged. As a result, it is possible for the charging device to drive safely in all environmental and lighting conditions. The charging device can be configured to switch a respective lamp on and off depending on how bright a surrounding is. The driving direction indicators can be designed as blinking lights that are activated depending on the respective driving maneuver that needs to be performed.

According to a further advantageous embodiment, the charging device comprises at least one laterally arranged socket chamber, which can be closed by a cover, to accommodate a charging interface and/or an electrical interface. As a result, the electrical charging interface or the electrical interface is arranged in a weatherproof fashion in the socket chamber, which is closed by the cover. The cover is removed from the socket chamber for charging.

According to a further advantageous embodiment, an axis of rotation extends from at least one of the wheels through the socket chamber. This enables a very compact design of the charging device. In particular, the socket chamber can be arranged in the region of a wheel hub of one of the wheels.

A system according to the disclosure that supplies electrical charging energy for electrical energy stores of mobile electrical consumer units comprises at least one central data-processing unit with at least one energy store and at least one charging device according to one of the above-mentioned embodiments or any combination of at least two of these embodiments. The consumer unit comprises at least one transmitting unit, via which the consumer unit can transmit location information wirelessly to the data-processing unit, wherein the charging device has at least one receiving unit, via which the charging device can receive the location information wirelessly from the data-processing unit. The charging device is configured to make a self-driven journey based on the location information and the detected temporary location of the charging device.

The advantages mentioned above with reference to the charging device are also associated correspondingly with the system.

The central data-processing unit can be a server/computer unit positioned at a service provider that receives location information from mobile electrical consumer units, and passes the location information on to a specific charging device. With the aid of this location information, the respective charging device can then drive independently to the mobile electrical consumer unit.

The system preferably comprises a plurality of charging devices. These charging devices can transmit a respective temporary location and a respective temporary charging level of the energy storage units, regularly or continuously, to the central data-processing unit. The central data-processing unit can, when a specific charging request or location information from a mobile electrical consumer unit is present, select the charging device that has a charging level sufficient for the required charging procedure, and that can reach the mobile electrical consumer unit fastest. The central data-processing unit can transmit the location information to the selected charging device so that this charging device drives itself to the mobile electrical consumer unit.

The system preferably comprises a plurality of mobile electrical consumer units. The mobile electrical consumer units can take the form of, for example, motor vehicles that can be powered by electricity, for example cars, trucks, bicycles, motorbikes, and the like, or mobile communications devices, for example smartphones, tablets, laptops, and the like. The mobile electrical consumer units can, in particular, take different forms. The mobile electrical consumer units can be configured so as to transmit, in addition to their location information, information about the amount of charging energy required to the central data-processing unit via their transmitting unit. The central data-processing unit can be configured so as to select a specific charging device depending on the information about the amount of charging energy required, information about the charging levels of individual charging devices, and location information of charging devices. As a result, the charging device for the required charging procedure can be selected that has a charging level that can supply an amount of charging energy required, and that can reach the mobile electrical consumer unit fastest.

The disclosure is explained by way of example below with reference to the attached drawings and with the aid of preferred embodiments, wherein features mentioned below

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
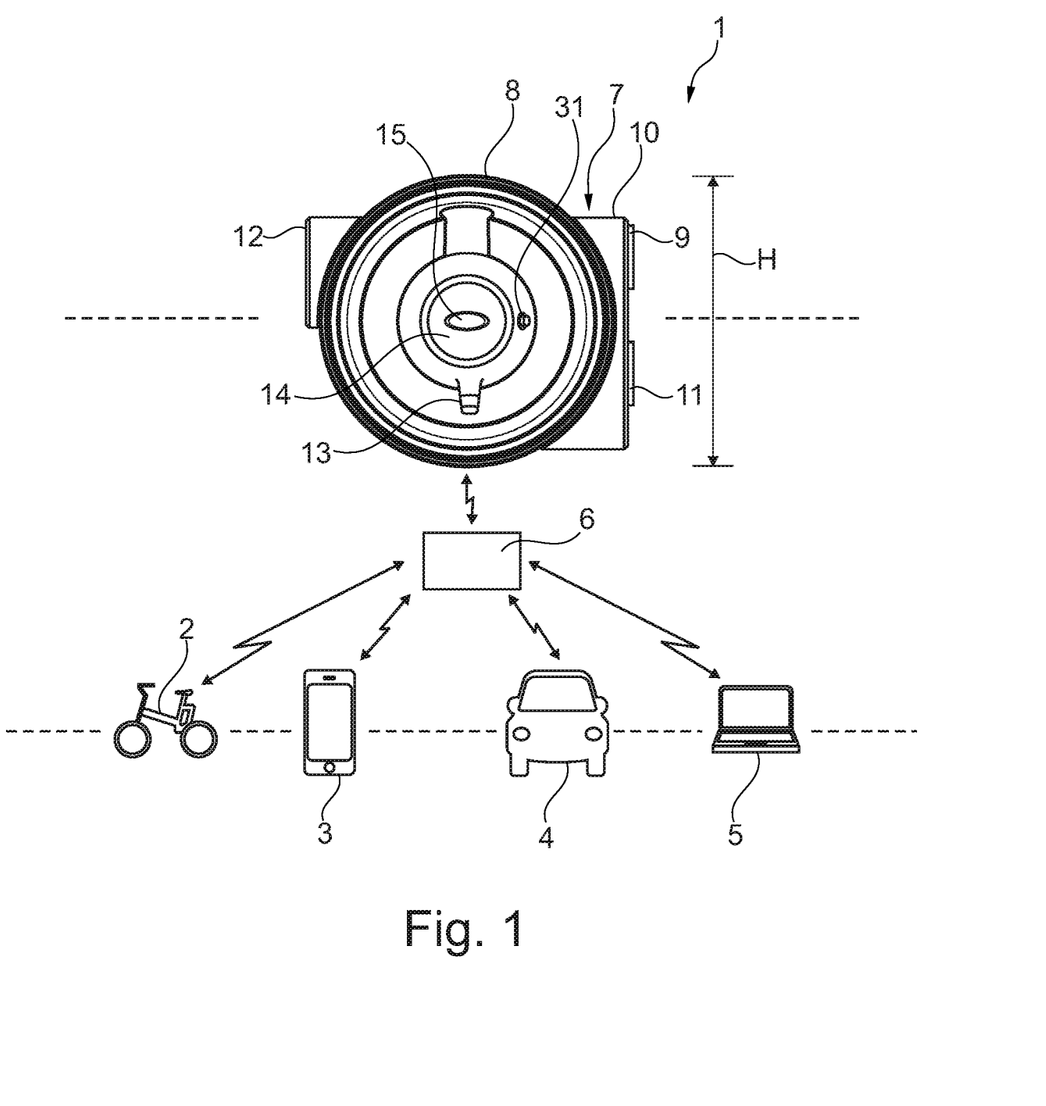
FIG. 1 shows a schematic view of an exemplary embodiment for a system according to the disclosure.

FIG. 1 shows a schematic view of an exemplary embodiment for a system 1 according to the disclosure that supplies electrical charging energy for electrical energy stores of mobile electrical consumer units 2 to 5. The consumer unit 2 is an electrically powered two-wheeled vehicle, the consumer unit 3 is a smartphone, the consumer unit 4 is an electrically powered car, and the consumer unit 5 is a laptop.

The system 1 comprises a central data-processing unit 6 that has a server/computer unit (not shown).

The system 1 furthermore comprises a plurality of mobile electrical consumer units, in which only consumer units 2 to 5 are shown. Each consumer unit 2, 3, 4 and 5 have at least one electrical energy store (not shown). Each consumer unit 2, 3, 4 and 5 comprises at least one transmitting unit (not shown) via which the respective consumer unit 2, 3, 4 and 5 can transmit location information wirelessly to the data-processing unit 6. Each mobile electrical consumer unit 2, 3, 4 and 5 can be connected to the central data-processing unit 6 via a wireless communications network.

The system 1 moreover comprises a plurality of charging devices 7 that supplies electrical charging energy for the electrical energy stores of the mobile electrical consumer units 2 to 5, with only a single charging device 7 being shown in FIG. 1. Each charging device 7 comprises at least one receiving unit (not shown) via which the respective charging device 7 can wirelessly receive location information from the data-processing unit 6. Each charging device 7 can be connected to the central data-processing unit 6 via the wireless communications network.

Each charging device 7 comprises at least one electrical energy storage unit (not shown) and at least one charging interface (not shown) via which electrical charging energy can be transferred from the energy storage unit to an energy store of a mobile electrical consumer unit 2, 3, 4 and 5. Each charging device 7 is a self-driving electric-powered motor vehicle. In particular, each charging device 7 is configured so as to drive itself based on the location information and the detected temporary location of the respective charging device 7.

Each charging device 7 additionally comprises at least one electrical interface (not shown) via which electrical charging energy can be transferred from an electrical charging station (not shown) to the energy storage unit of the respective charging device 7.

In addition, each charging device 7 takes the form of a two-track motor vehicle that has only two wheels 8, which are driven individually. A height H of the charging device 7 corresponds to a height of the wheels 8.

Each charging device 7 furthermore comprises at least one sensor device 31 that detects information on surroundings of the respective charging device 7.

Each charging device 7 additionally comprises a display unit 9 that displays a charging level of the energy storage unit of the respective charging device 7.

Each charging device 7 furthermore comprises a housing unit 10, that accomodates the energy storage unit, on which a front lamp 11, a rear lamp 12, and two driving direction indicators 13 are arranged.

Each charging device 7 moreover comprises a laterally arranged socket chamber, closed by and situated behind a cover 14, to accommodate the electrical charging interface and/or the electrical interface. An axis of rotation 15 of the wheels 8 extends through the socket chamber.

Figure 2:
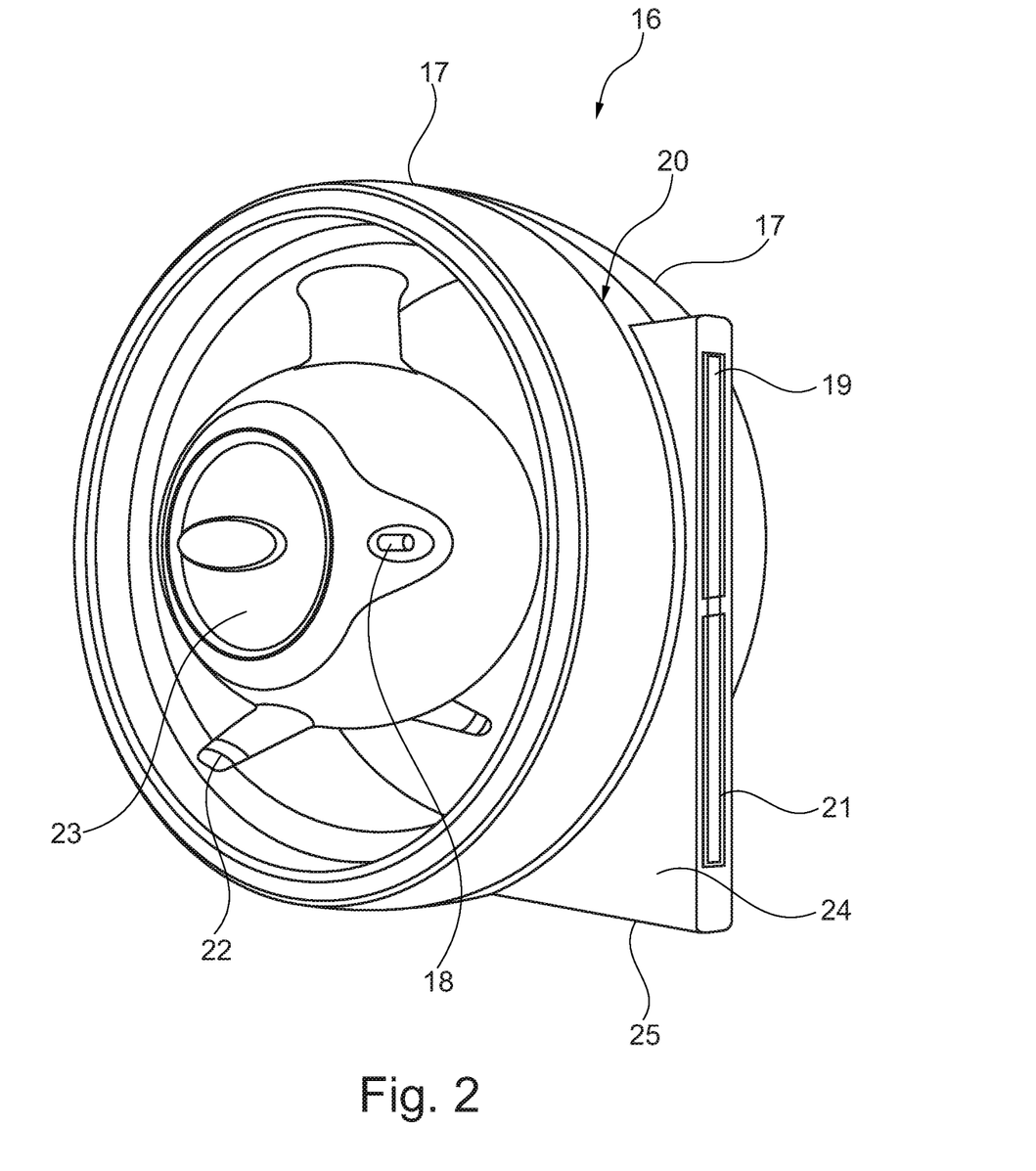
FIG. 2 shows a schematic and perspective side view of an exemplary embodiment for a charging device according to the disclosure.

FIG. 2 shows a schematic and perspective side view of an exemplary embodiment for a charging device 16 according to the disclosure that supplies electrical charging energy for electrical energy stores of mobile electrical consumer units (not shown). The charging device 16 is designed as a self-driving motor vehicle.

The device 16 comprises at least one electrical energy storage unit (not shown) and at least one charging interface (not shown) via which electrical charging energy can be transferred from the energy storage unit to an energy store of a mobile electrical consumer unit. The charging device 16 furthermore comprises at least one electrical interface (not shown) via which electrical charging energy can be transferred from an electrical charging station (not shown) to the energy storage unit of the charging device 16.

The charging device 16 is designed as a two-track motor vehicle that has only two wheels 17, which can be driven individually. The height of the charging device 16 corresponds to the height of the wheels 17, as indicated in FIG. 1.

The charging device 16 comprises a sensor device 18 that detects information on surroundings of the charging device 16 on the right-hand side, and a sensor device (shown in FIG. 3) that detects information on surroundings of the charging device 16 on the left-hand side.

The charging device 16 furthermore comprises a display unit 19 that displays the charging level of the energy storage unit of the charging device 16.

Figure 3:
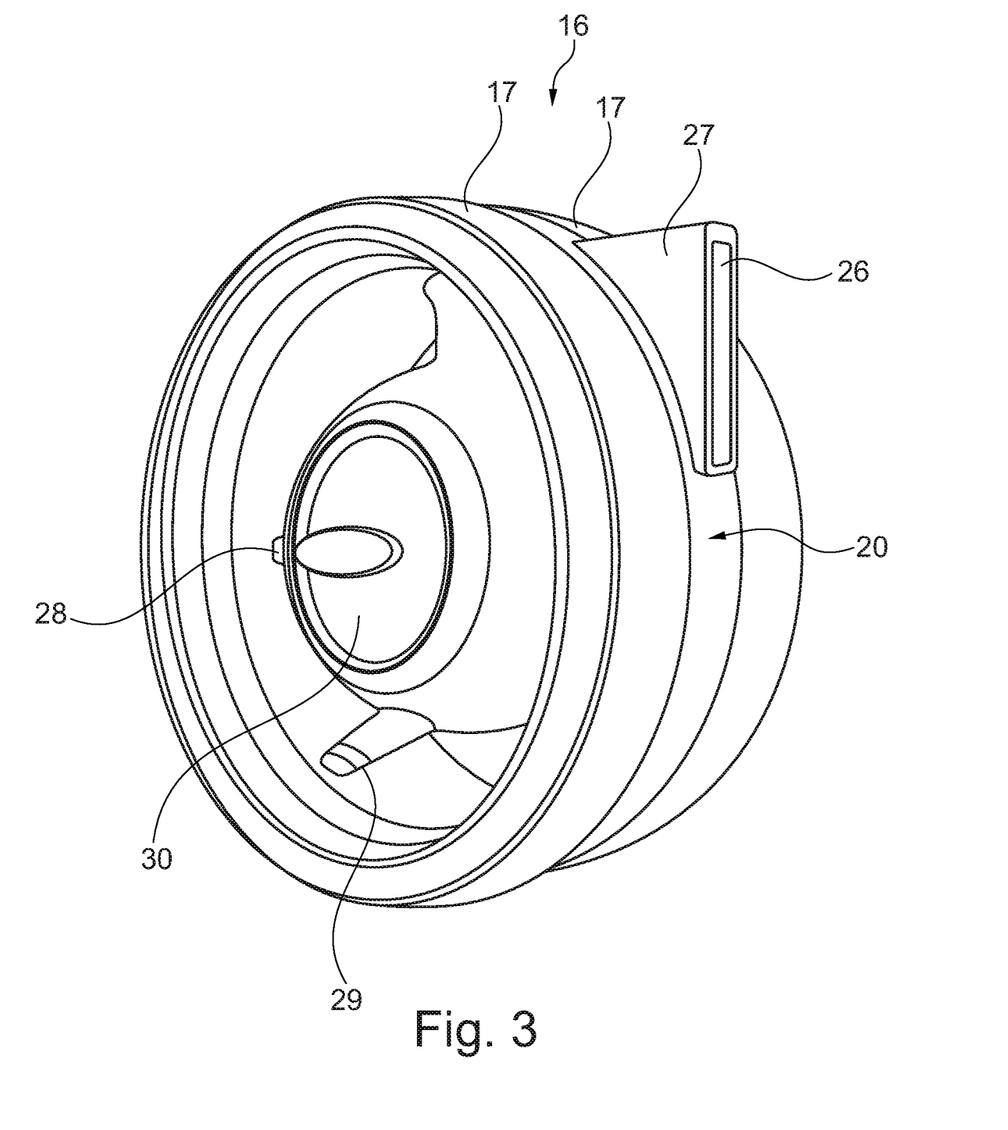
FIG. 3 shows a schematic and perspective side view of the charging device shown in FIG. 2.

In addition, the charging device 16 comprises a housing unit 20, accommodating the energy storage unit, on which a front lamp 21, a rear lamp 12 (shown in FIG. 3), a right-hand driving direction indicator 22 and a left-hand driving direction indicator shown in FIG. 3 are arranged.

The charging device 16 furthermore comprises a laterally arranged right-hand socket chamber, closed by a cover 23, to accommodate the electrical charging interface and/or the electrical interface, and a left-hand socket chamber, closed by a cover (shown in FIG. 3), to accommodate the electrical charging interface and/or the electrical interface. An axis of rotation of the wheels 17 extends through the socket chambers.

The front lamp 21 and the display unit 19 are arranged on a housing section 24, projecting from the front of the housing unit 20, which has a flat support base 25 via which the charging device 16 can be supported on the ground when deactivated.

FIG. 3 shows a further schematic and perspective side view of the charging device 16 (shown in FIG. 2). A rear light 26, which is arranged on a housing section 27 projecting toward a rear in an upper region. In addition, a left-hand sensor device 28, a left-hand driving direction indicator 29, and a cover 30 are shown.

Figure 4:
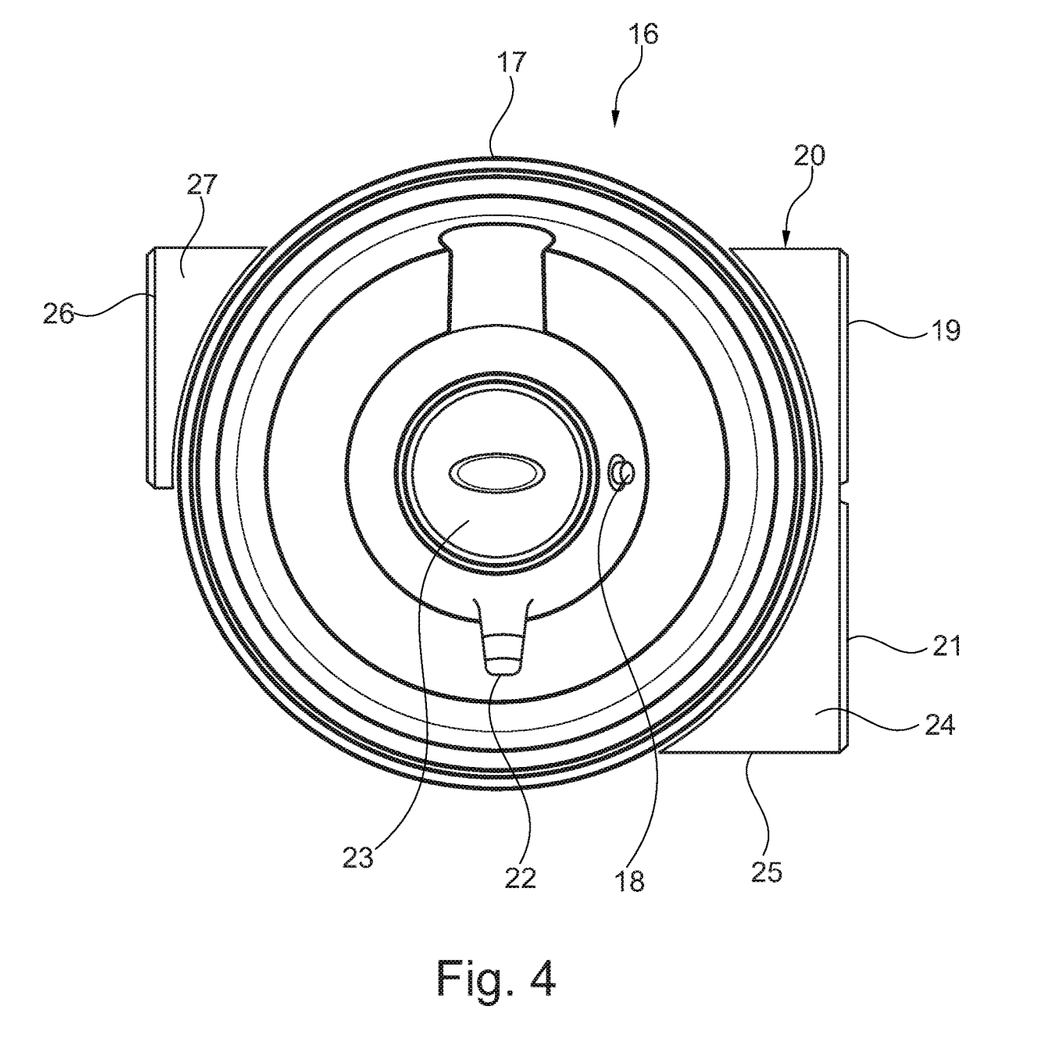
FIG. 4 shows a side view of a right-hand side of the charging device shown in FIGS. 2 and 3.

FIG. 4 shows a side view of the right-hand side of the charging device 16 shown in FIGS. 2 and 3. Both housing sections 24 and 27 are shown, on which the display unit 19 and the front lamp 21 or the rear lamp 26 are arranged.

Figure 5:
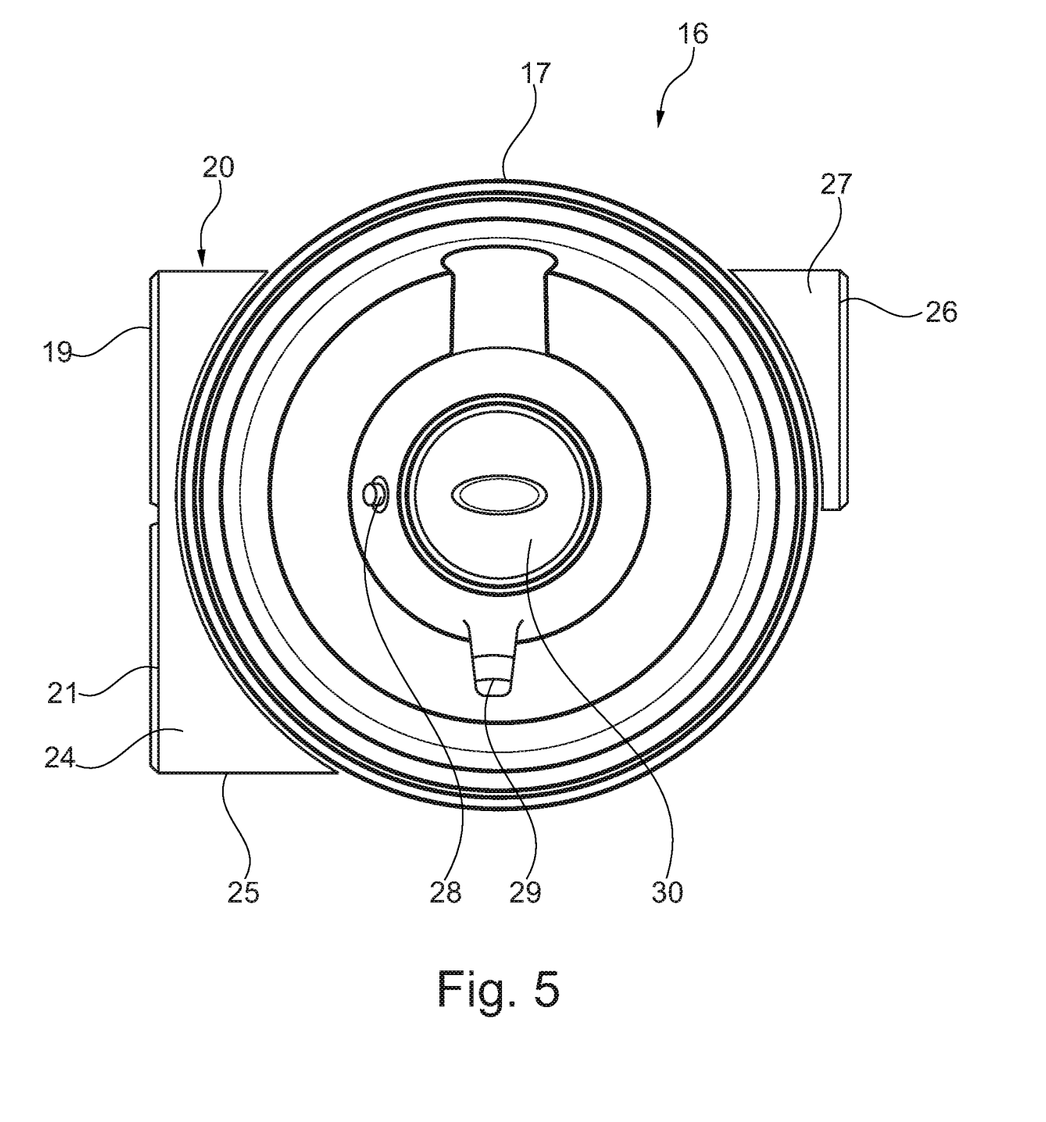
FIG. 5 shows a side view of a left-hand side of the charging device shown in FIGS. 2 to 4.

FIG. 5 shows a side view of the left-hand side of the charging device 16 shown in FIGS. 2 to 4.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system that supplies electrical charging energy comprising:
    at least one central data-processing unit with at least one energy store;
    a consumer unit that has at least one transmitting unit that transmits location information wirelessly to the central data-processing unit; and
    at least one charging device that has at least one receiving unit that receives the location information wirelessly from the data-processing unit such that the charging device makes a self-driven journey based on the location information and a detected temporary location of the charging device, wherein the charging device further includes a wheel for driving the charging device, at least one laterally-arranged socket chamber that receives at least one electrical interface, and an axis of rotation of the wheel of the charging device extends from a wheel through the socket chamber.

2. The system as claimed in claim 1 further comprising at least one electrical interface on the charging device configured to transfer electrical charging energy from an electrical charging station to the energy store.

3. The system as claimed in claim 1 further comprising at least one sensor that detects information about a surrounding of the charging device.

4. The system as claimed in claim 1 further comprising at least one display unit that displays a charging level of the energy store.

5. A vehicle comprising:
    a charging device in communication with a consumer unit having a transmitter that transmits information wirelessly to a processor and an energy store, the charging device has an interface that transfers energy from an energy storage unit to the energy store, and a receiver that receives the location information from the processor such that the charging device makes a self-driven journey based on the information and a temporary location while supplying energy to the energy store, wherein the charging device further includes a wheel for driving the charging device, at least one laterally-arranged socket chamber that receives at least one electrical interface, and an axis of rotation of the wheel of the charging device extends from a wheel through the socket chamber.

6. The vehicle as claimed in claim 5, wherein the interface is configured to transfer energy from an electrical charging station to the energy store.

7. The vehicle as claimed in claim 5 further comprising a sensor that detects information about a surrounding of the charging device.

8. The vehicle as claimed in claim 5 wherein the laterally-arranged socket chamber that is closed by a cover and receives the interface.

9. The vehicle as claimed in claim 5 further comprising at least one display unit that displays a charging level of the energy store.

* * * * *